US007003306B2

(12) United States Patent
Henry-Labordere

(10) Patent No.: US 7,003,306 B2
(45) Date of Patent: Feb. 21, 2006

(54) SHORT MESSAGE SYSTEM, ESPECIALLY PREPAID MESSAGE SYSTEM

(75) Inventor: Arnaud Henry-Labordere, Paris (FR)

(73) Assignee: Nilcom, Boulogne Billancourt (FR)

( * ) Notice: Subject to any disclaimer, the term of this patent is extended or adjusted under 35 U.S.C. 154(b) by 416 days.

(21) Appl. No.: 10/127,192

(22) Filed: Apr. 22, 2002

(65) Prior Publication Data

US 2003/0036394 A1    Feb. 20, 2003

(30) Foreign Application Priority Data

May 30, 2001    (FR) ................................. 01 07052

(51) Int. Cl.
*H04Q 7/20*    (2006.01)
(52) U.S. Cl. .................. 455/466; 455/560; 455/412.1; 455/406; 455/445; 705/39
(58) Field of Classification Search ................ 455/466, 455/445, 412.1, 462, 560, 555, 406, 408; 705/39
See application file for complete search history.

(56) References Cited

U.S. PATENT DOCUMENTS

| | | | | |
|---|---|---|---|---|
| 6,108,701 | A * | 8/2000 | Davies et al. ................ 709/224 |
| 6,424,828 | B1 * | 7/2002 | Collins et al. ............ 455/412.1 |
| 6,560,456 | B1 * | 5/2003 | Lohtia et al. ................ 455/445 |
| 6,801,781 | B1 * | 10/2004 | Provost et al. ............... 455/466 |
| 2002/0029189 | A1 * | 3/2002 | Titus et al. .................... 705/39 |
| 2002/0150079 | A1 * | 10/2002 | Zabawskyj et al. ......... 370/351 |
| 2002/0159600 | A1 * | 10/2002 | Weiner ........................ 380/270 |
| 2003/0091170 | A1 * | 5/2003 | McCann et al. ......... 379/114.2 |
| 2003/0119482 | A1 * | 6/2003 | Girard ........................ 455/411 |
| 2003/0144015 | A1 * | 7/2003 | Ham ........................... 455/466 |

FOREIGN PATENT DOCUMENTS

| | | |
|---|---|---|
| GB | 2351880 A | 1/2001 |
| WO | WO 99/29125 A | 6/1999 |
| WO | WO 99/30461 A | 6/1999 |

\* cited by examiner

*Primary Examiner*—Lester G. Kincaid
*Assistant Examiner*—Marcos L Torres
(74) *Attorney, Agent, or Firm*—Baker & Daniels LLP

(57) ABSTRACT

Short message system (SMS-MO) comprising switching arrangements (MSC) and servers (SMSC) at which the messages arrive in the form of messages "destined for a mobile" (SMS-MT). The sending mobile (SMS-MO) includes in the message the address of the server (SMSC) of its card (SIM). The system comprises a virtual server (SMSC-V) which is defined by its address (ADR-V) and is associated with an operator, a real server (SMSC-R) which is defined by its address (ADR-R), the address (ADR-V) of the virtual server (SMSC-V) being the only server address recorded on the operator's cards (SIM), the switching arrangement (MSC) contains an address translator for replacing the address of the virtual server (SMSC-V) with that of the real server (SMSC-R) to which the message (SMS-MO) will be routed, which real server handles the message and routes it to the intended receiver (MO').

4 Claims, 2 Drawing Sheets

SHORT MESSAGE SYSTEM, ESPECIALLY PREPAID MESSAGE SYSTEM

BACKGROUND OF THE INVENTION

The present invention relates to a short message system, especially a prepaid message system, for sending messages by means of mobile telephones and, where appropriate, managing a prepaid short message service, which system comprises switching arrangements on which the mobiles depend for radio connection, and short message servers at which the messages from a mobile arrive and are routed back, in the form of messages "destined for a mobile", to the destination mobiles, the mobile sending messages including a secret code in the message, although that is not obligatory.

Short messages SMS are transmitted by mobile telephones. In a large number of cases, however, mobile telephones use the prepayment system, which does not allow the question of short messages to be handled efficiently.

The prepaid telephone card market for mobiles has been a major factor in the expansion of the mobiles market in order to avoid the problems of non-payment or to make a costly billing system more economical and simplify administration.

In some countries, all subscribers are prepaid, and some operators are abandoning post-payment completely and accepting only prepaid subscriptions.

Under these circumstances there arises the problem of the short message service which must be provided for subscribers with prepaid subscriptions, since short messages are likely to represent a very considerable proportion of an operator's activity.

There are at present three types of solution for dealing with this problem:
the intelligent network IN,
service nodes SN and
hot-billing.

The intelligent network IN uses a service control point SCP which is interrogated by service switching point software SSP of the short message services each time a subscriber wishes to make a telephone communication. The control point SCP then interrogates the credit database SDP in order to authorise the communication for a period of X seconds and interrupt it after that time.

The second solution is that of service nodes SN, which consists in routing all prepaid subscribers' communications to that dedicated switching arrangement, which manages the credit database.

Finally, hot-billing consists in creating billing tickets at the level of network switching arrangements MSC, which transmit periodically, typically every few minutes, their consumption to a debiting system for the credits that is capable of interrupting a call. However, this relatively old solution has many disadvantages owing to the risk of credit being exceeded.

In those three solutions for prepaid telephony, telephone credit can generally be topped up by the purchase of credit cards (scratch cards) which contain a concealed secret number with all security rules. That number is used to ask an interactive vocal server SVI to top up the credit by the amount of the scratch card. The various handling operations are relatively complicated. In addition, there is the cost of the interactive vocal server and that of the credit database SDP. Nevertheless, the invention can, without changing anything, also be associated with a SVI for topping up credit.

In that case, the system is more convenient to use because the prepaid user does not have to add a secret code before the text.

In conclusion, the solutions hitherto employed are relatively cumbersome, not very flexible, not very reliable and are generally not suitable for small or medium-sized operators.

Among the current technical solutions envisaged and envisageable for prepaid short messages, in the case of the intelligent network IN it is not possible to interrogate a service control point SCP when a message SMS-MO transmitted by a mobile is sent.

The second theoretical solution, that of service nodes (SN), does not work since they are not requested at the time of a SMS-MO unless a special SMSC which is capable of interrogating the credit in the SN is incorporated in the SN (a solution which is not very widespread and in this case the SMSC is too simplified).

Finally, the hot-billing of SMS-MO messages is a possibility, but the billing tickets for the SMS-MO messages are sent with a considerable delay, which may reach several hours, to the database SDP containing the credit remaining for the prepaid service. Where there is insufficient credit, there is disconnection by way of an interface with the database in order to locate the subscriber on the basis of his mobile number (HLR). The disadvantage of this solution is that it requires a specially developed and costly SDP server, as well as the disadvantage that debiting is delayed according to the rate of receipt of the SMS-MO message tickets.

Certain other solutions have already been employed, for example that of the SMSC server equipped with particular software allowing the credit database SDP to be interrogated, but such solutions have been developed in closed contexts. The solution is excellent but the price of the software is very high.

Finally, another solution which is sometimes used by some large operators consists in sending all SMS-MO messages to a dedicated server SMSC which sends them, by way of a dedicated connection, to the credit management point SDP; the latter checks whether the subscriber is prepaid and whether he has credit, and then sends the message to other servers SMSC dedicated to forwarding the message to the destination mobile (SMS-MT), while the first server SMSC is dedicated to messages coming from a mobile SMS-MO with reduced means, in a flexible manner and in total security.

In that system, SMS message debits are made in real time, but the cost of the solution is relatively high and it is not suitable for small or medium-sized operators.

The object of the present invention is to develop a short message system which is, in particular, suitable for small and medium-sized operators and, especially, for those which have only prepaid subscribers, allowing prepaid short messages SMS to be managed easily.

SUMMARY OF THE INVENTION

The present invention relates to a system which is characterised in that it comprises:
a virtual server which is defined by its address and is associated with an operator,
a real server which is defined by its address,
the address of the virtual server being the only server address recorded on the operator's cards,
the switching arrangement contains an address translator for replacing the address of the virtual server with that of the real server to which the message will be routed, which real server handles the message and routes it to the intended receiver.

This system has the advantage that it is very simple to implement and, especially, has possibilities for expansion and for being opened up. In fact, the system allows different operators to join together and to have their subscribers' short messages handled by the real server, by way of the address of a virtual server and the translation of that address, which is carried out by the switching arrangement(s) of the operator.

In particular, this allows the handling of short messages of operators from different countries to be grouped together.

The real server is therefore located in a different country from that of the operator, and the connection between the switching arrangement of the operator of the sending subscriber and the real server is made by way of the international network.

And, in particular, the virtual server has an address in the country of the operator on which the subscriber sending the message depends.

The invention is of interest especially in the management of the short message service and, in particular, in allowing prepayment therefor.

To that end, the system comprises a prepaid card database containing the credit accounts of prepaid short message cards and the associated code numbers, a prepaid short message card, having a secret code, which the subscriber purchases and the secret code of which he uses and includes in his short messages, the real short message server receiving a short message from a mobile and verifying authorisation of transmission by checking the code and the account credit assigned to that code in the prepaid card database, and it sends the message to the intended receiver if the credit permits, and otherwise the server sends a credit exhaustion message to the mobile sending the message.

BRIEF DESCRIPTION OF THE DRAWINGS

The present invention will be described hereinbelow in more detail with the aid of three embodiments of short message systems shown in the attached drawings, in which.

Figure 1:
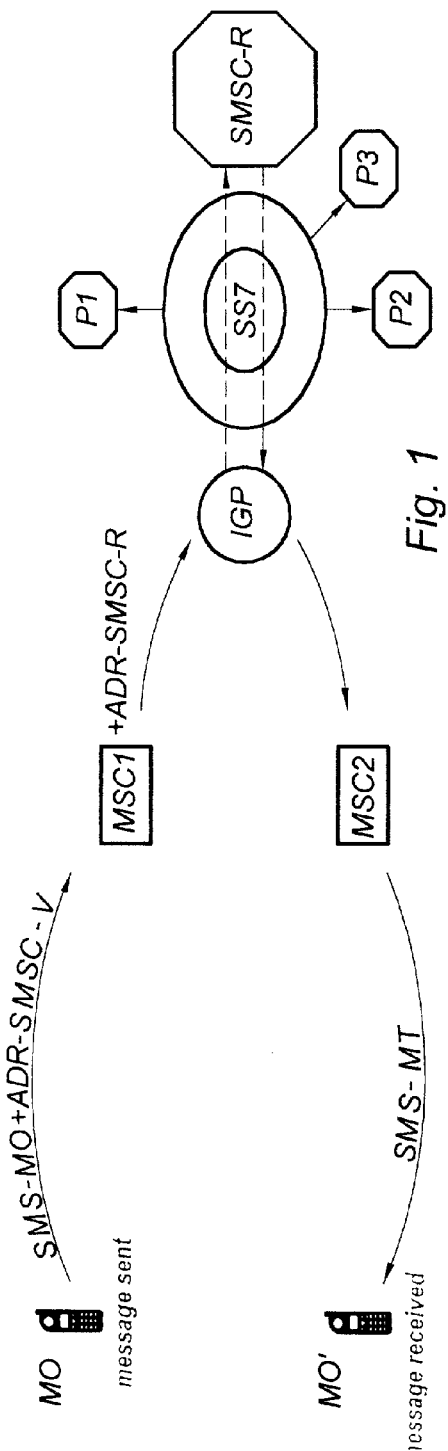
FIG. 1 shows a short message system in its general definition.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DESCRIPTION OF THE PREFERRED EMBODIMENT

According to FIG. 1, a system of short messages sent by mobiles MO comprises switching arrangements MSC1 which receive the short messages SMS-MO and transmit them to a short message server, for example by way of an international network SS7 and a gateway IGP in the case where the short message server is not in the same country as the switching arrangement MSC.

The server searches for the destination mobile MO' and then transmits the short message SMS back, in the form of a short message mobile terminated SMS-MT, by substantially the opposite path, passing through the international network SS7 again and the switching arrangement MSC2 on which the destination mobile MO' depends.

More precisely according to the invention, the system comprises a virtual server SMSC-V which is defined solely by its address ADR-V, and that server is associated with an operator or with the switching arrangements MSC of that operator, for example the switching arrangement MSC1 on which a mobile MO depends.

The system also comprises a real server SMSC-R which is defined by its address ADR-R.

The address ADR-V of the virtual server SMSC-V is the only server address that will be supplied to the mobile MO using this service.

The address ADR-V is recorded on the SIM cards of the users of the operator connected to the switching arrangement MSC1. The real address is not known to the user and exists only in the address translator.

According to the invention, the switching arrangements of the system, and in particular the switching arrangement MSC1, contain an address translator which automatically replaces the virtual address ADR-V with the address ADR-R of the real server SMSC-R which is to handle the messages.

According to the example shown, the real server SMSC-R is located in a different country from that of the switching arrangement MSC1 or the operator on which it depends, and the connection is made by way of the international network SS7 and by way of a gateway IGP.

Different countries P1, P2, P3 are shown diagrammatically as being connected to the international network SS7.

The centralised server SMSC-R is able to handle messages for operators located in different countries, such as the operator using the switching arrangement MSC1. In each of the countries P1, P2, P3 it is possible to have operators associated with switching arrangements MSC equipped with an address translator.

In each country, the SIM cards for the mobiles MO contain the address of a virtual server as the address ADR-V described above. When a message is received, the address translator of the country's network switching arrangement replaces the virtual address ADR-V with the real address ADR-R and routes the message to the real server SMSC-R, which centralises the messages and forwards them to their intended receiver.

Forwarding is carried out to the switching arrangement of the destination mobile MO' back by way of the international network SS7 and the gateway IGP, if the switching arrangement MSC2 of the intended receiver is not located in the same country as the server SMSC-R, which corresponds to the most general case shown in FIG. 1.

Figure 2:
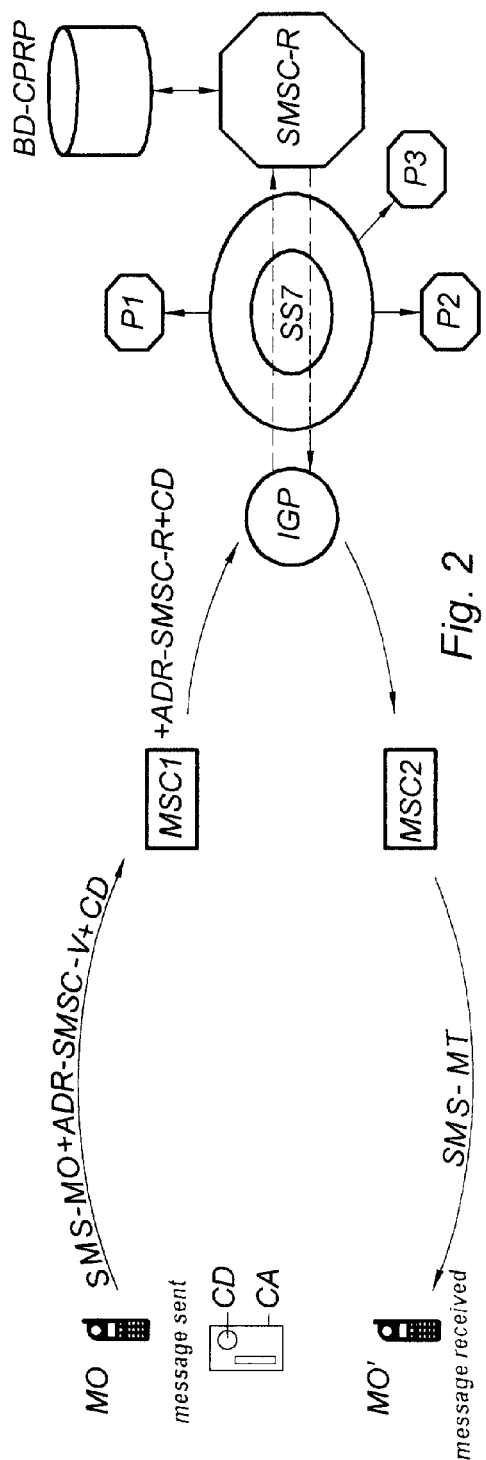
FIG. 2 shows a prepaid short message system.

FIG. 2 shows the application of the general system according to the invention to the handling and management of prepaid short messages.

The organisation of the system is the same. Each short message operator uses a virtual server SMSC-V whose address ADR-V is recorded on the SIM cards supplied by that operator.

As in the general system, the SIM card of each user contains the address ADR-V of the virtual server SMSC-V on which the switching arrangement MSC1 of the mobile MO depends. In order to send prepaid messages, the user of the mobile MO obtains a prepaid message card CA. That card opens a corresponding credit for him.

The card CA, which is different from the SIM card, contains the user's credit code CD. The user includes the code CD in each message to be sent by the mobile MO. The code forms part of the message.

At the same time as the message is sent, the virtual server's address ADR-V is also transmitted. The address is transmitted automatically without the user of the mobile MO having to take any action.

The prepayment system is also completed by a prepaid card database BD-CPRP which manages the credits. The database contains the codes CD and the credits associated with the codes.

The base is connected to the real server SMSC-R.

When a short message SMS-MO is sent by the mobile MO, the message, which is automatically combined with the virtual address ADR-V of the virtual server, and the code CD included in the message SMS-MO arrive at the switching arrangement MSC1, which simply translates the virtual address ADR-V into the real address ADR-R without touching the code CD, because the code forms part of the text of the message.

The message is then transmitted by the switching arrangement MSC1 to the real server SMSC-R, either directly, if that server is in the same country, or by way of the international network SS7 and the associated gateway IGP.

The server SMSC-R receiving the message refers to the database BD-CPRP in order to check the code and the available credit assigned to that code. If the amount of credit is greater than the cost of transmitting the message, the message is handled. Otherwise, it is rejected.

In order to handle the message, the server SMSC-R sends it, in the form of a message mobile terminated SMS-MT, to the mobile MO', as has already been described, optionally using the international network SS7, the gateway IGP to the switching arrangement MSC2 of the destination mobile MO'.

The message SMS-MT which is sent will have been cleaned of the code CD, which will not appear in the text of the message SMS-MT.

If there is not sufficient credit to authorise transmission, the server SMSC-R sends a corresponding message to the sending mobile MO, by way of optionally the international network SS7, the gateway IGP, the switching arrangement MSC1 and the mobile MO.

The invention makes it possible to generalise operation to the case of "post-paid" subscribers, for whom no credit check is carried out. To that end, the SMSC-R must know whether the subscriber is prepaid or not, which in almost all cases cannot be deduced from the number of the originating mobile.

Figure 3:
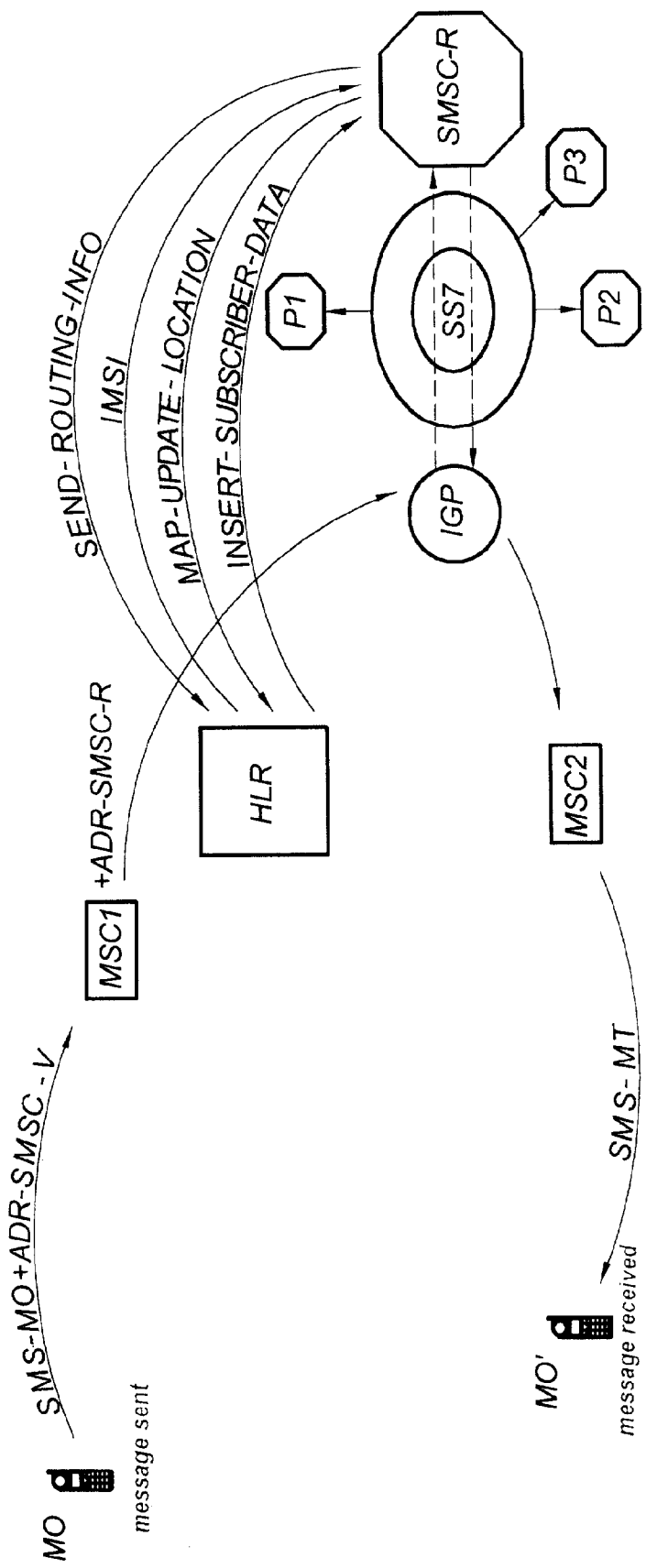
FIG. 3 shows a centralised short message system which operates both for prepaid subscribers and for post-paid subscribers.

According to FIG. 3, the SMSC-R sends a GSM message of the type "MAP-UPDATE-LOCATION" to the HLR of the originating subscriber, which message contains the number of the MSC visited, because it receives it with the SMS-MO, which it knows, the associated VLR number, which it deduces from the MSC using a table, the originator's IMSI, which is obtained by interrogating the HLR.

The SMSC-R therefore behaves like a VLR. In response, the HLR sends a standard GSM message of the type "MAP-INSERT-SUBSCRIBER-DATA" which contains a subscriber profile allowing it to be known whether the subscriber is prepaid or not, without actually modifying the location. In the latter case, checking of the CD code with access to the database is not carried out.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

GLOSSARY

IMSI International Mobile Subscriber Identity

IN Intelligent Network

SCP Service Control Point of the Intelligent Networks, which has the service logic SMSC Information system allowing the receipt of Short Messages sent by a mobile (SMS-MO) and the transmission thereof to another mobile subscriber (SMS-MT)

SMS-MO Short Message Service Mobile Originated, service for sending Short Messages from a mobile to a SMSC, offered by a mobile operator SMS-MT Short Message Service Mobile Terminated, service consisting in sending a Short Message, from a SMSC, to a mobile MSC Mobile Switching Centre, Switching Centre of a mobile operator, allowing communications to be established (and "SMS-MO" to be sent)

HLR Home Location Register, database allowing a subscriber to be located on the basis of his mobile number SDP Service Data Point, database interrogated by a HLR and containing, in the case of a prepaid service, the remaining credit "prepaid" System of paying for services by a mobile subscriber, consisting in allowing him to purchase a card representing a defined usage of the services [in contrast to "post-paid" services, where a bill is sent out (monthly) once the services have been used]

SDP credit database

SVI interactive vocal server

SSP switching point software "hot-billing" hot-billing, but not actually immediate billing VLR Visited Location Register, database containing the detailed location of a subscriber and the profile of authorised services.

What is claimed is:

1. Short message system for handling short messages (SMS-MO) sent by mobiles (MO), comprising switching arrangements (MSC) on which the mobiles (MO) depend for radio connection, and short message servers (SMSC) at which the messages from a mobile (SMS-MO) arrive and are routed back, in the form of messages "destined for a mobile" (SMS-MT), to the destination mobiles (MO'), the mobile sending messages (SMS-MO) including in the message the address of the server (SMSC) of a card (SIM), the system comprising:

a virtual server (SMSC-V) which is defined by its address (ADR-V) and is associated with an operator, the address (ADR-V) of the virtual server (SMSC-V) being the only server address recorded on said cards (SIM);

a real server (SMSC-R) which is defined by its address (ADR-R);

the switching arrangement (MSC) contains an address translator for replacing the address (ADR-V) of the virtual server (SMSC-V) with the address (ADR-R) of the real server (SMSC-R) to which the message (SMS- MO) will be routed, which real server handles the message and routes it to the intended receiver (MO');

a prepaid card database (BD-CP RP) containing credit accounts of prepaid short message cards and their associated code numbers; and a prepaid short message card (CA), having a secret code (CD), which the subscriber purchases, the subscriber using a secret code (CD) and including the secret code (CD) in his short messages (SMS-MO), when there is no interactive vocal server (SVI) for top-up, whereby the real short message server (SMSC-R), upon receipt of a short message (SMS) from a mobile, verifies authorisation of transmission by checking the code (CD) and the account credit assigned to that code (CD) in the prepaid card database (BD-CPRP), and thereupon sends the message to the intended receiver (SMS-MT) if the credit permits, and, if no credit is permitted, the server (SMSC-R) sends a credit exhaustion message to the mobile (MO) which sent the message (SMS-MO).

2. Short message system according to claim 1 wherein the real server (SMSC-R) is located in a different country than the country in which the operator is located, and the connection between the switching arrangement (MSC) of the operator visited by the transmitting subscriber (MO) and the real server (SMSC-R) is made by way of the international network (SS7).

3. System according to claim 1 wherein the virtual server (SMSC-V) has an address in the country of the operator on which the subscriber (MO) sending the message (SMS-MO) depends.

4. System according to claim 1 further comprising allowing the real server (SMSC-R) to also supply the short message service (SMS-MO) to non-prepaid subscribers without checking the secret code, solely on the basis of the number of the sending subscriber, by obtaining the subscriber profile from the HLR in order to ascertain whether the subscriber is prepaid or not, and by behaving like a VLR which carries out a GSM location update procedure (MAP-UPDATE-LOCATION) without updating location information.

* * * * *